US012486699B2

(12) United States Patent
Weist et al.

(10) Patent No.: US 12,486,699 B2
(45) Date of Patent: Dec. 2, 2025

(54) PASS-THROUGH DOOR COMPARTMENT INTERLOCK MECHANISM

(71) Applicant: Clean Air Products Co., Minneapolis, MN (US)

(72) Inventors: Kevin Weist, Plymouth, MN (US); Tyler Weeden, Coon Rapids, MN (US)

(73) Assignee: Clean Air Products Co., Minneapolis, MN (US)

( * ) Notice: Subject to any disclaimer, the term of this patent is extended or adjusted under 35 U.S.C. 154(b) by 196 days.

(21) Appl. No.: 18/215,779

(22) Filed: Jun. 28, 2023

(65) Prior Publication Data

US 2024/0018811 A1 Jan. 18, 2024

Related U.S. Application Data

(60) Provisional application No. 63/389,670, filed on Jul. 15, 2022.

(51) Int. Cl.

| | |
|---|---|
| ***E05C 7/02*** | (2006.01) |
| ***A47G 29/20*** | (2006.01) |
| ***B01L 1/00*** | (2006.01) |
| ***E05C 17/08*** | (2006.01) |
| ***E05G 7/00*** | (2006.01) |

(52) U.S. Cl.
CPC ................ *E05C 7/02* (2013.01); *A47G 29/20* (2013.01); *B01L 1/00* (2013.01); *E05C 17/08* (2013.01); *E05G 7/005* (2013.01)

(58) Field of Classification Search
CPC ... E05C 7/00; E05C 7/002; E05C 7/02; E05C 7/04; E05C 7/06; A47G 29/20; A47G 29/28; A47G 29/1209; A47G 29/12095; A47G 29/14; E05B 2063/02026; E05B 63/0052; E05B 63/24; E05B 63/244; E05B 63/248; E05B 15/024; E05B 15/025; E05B 15/0245; E05B 63/143; E05B 2063/0026; E05G 1/026; E05G 1/04; E05G 7/005; E05G 7/008; G07D 11/125
USPC .................................... 232/1 E, 19, 43.4, 44
See application file for complete search history.

(56) References Cited

U.S. PATENT DOCUMENTS

| | | | | | | |
|---|---|---|---|---|---|---|
| 976,261 | A | * | 11/1910 | Hodgkinson | A47G 29/20 | 49/67 |
| 1,038,583 | A | * | 9/1912 | Hodgkinson | A47G 29/20 | 232/20 |
| 1,046,784 | A | * | 12/1912 | Hartman | A47G 29/20 | 232/23 |
| 1,219,360 | A | * | 3/1917 | Storms | A47G 29/20 | 232/41 D |
| 1,222,966 | A | * | 4/1917 | Matchette | A47G 29/14 | 232/1 R |
| 1,458,200 | A | * | 6/1923 | Sloan | A47G 29/20 | 292/108 |

(Continued)

*Primary Examiner* — Alyson M Merlino
(74) *Attorney, Agent, or Firm* — Schwegman Lundberg & Woessner, P.A.

(57) ABSTRACT

A locking assembly is operatively coupled to a first door and a second door of a pass-through housing. The locking assembly includes a first locking pin on the first door and a second locking pin on the second door. The locking assembly engages the first locking pin and locks the first door when the second door is opened, and engages the second locking pin and locks the second door when the first door is opened.

13 Claims, 5 Drawing Sheets

(56) References Cited

U.S. PATENT DOCUMENTS

| | | | | | |
|---|---|---|---|---|---|
| 1,685,998 | A * | 10/1928 | Hagstrom | E05C 7/002 70/262 |
| 1,920,813 | A * | 8/1933 | Storms | E05C 7/02 232/41 D |
| 3,110,438 | A * | 11/1963 | Leckner | E05C 7/002 232/43.4 |
| 3,174,193 | A * | 3/1965 | Smith | E05C 7/002 292/25 |
| 3,219,086 | A * | 11/1965 | Zahodiakin | F16B 37/044 411/965 |
| 3,602,536 | A * | 8/1971 | Gamble | E05C 7/002 70/432 |
| 3,826,520 | A * | 7/1974 | Ross | E05C 7/002 292/53 |
| 4,011,686 | A * | 3/1977 | Jett, III | E05G 7/005 292/218 |
| 4,435,027 | A * | 3/1984 | Prather | E05B 65/0003 292/DIG. 40 |
| 4,447,005 | A * | 5/1984 | Kelly | A47G 29/121 232/35 |
| 6,149,213 | A * | 11/2000 | Sokurenko | E05B 15/025 292/DIG. 55 |
| 2019/0112850 | A1* | 4/2019 | D'Souza | E05C 17/54 |

* cited by examiner

PASS-THROUGH DOOR COMPARTMENT INTERLOCK MECHANISM

CLAIM OF PRIORITY

This application claims the benefit of priority under 35 U.S.C. § 119(e) to U.S. Provisional Patent Application Ser. No. 63/389,670, filed on Jul. 15, 2022, which is incorporated by reference herein in its entirety.

TECHNICAL FIELD

The present disclosure generally relates to an interlock mechanism for a pass-through compartment, and in an embodiment, but not by way of limitation, an interlock mechanism that engages a first locking pin to lock a first door on the pass-through compartment when a second door on the pass-through compartment is open, and to engage a second locking pin to lock the second door when the first door is open.

BACKGROUND

Pass-through compartments consist of a square, rectangular or other similarly shaped unit, and have a first door and a normally opposing second door. The pass-through compartment is usually placed into a wall or other barrier. A first person on one side of the wall opens the first door, places an object into the pass-through compartment, and then closes the first door. Sometime thereafter, a second person on the other side of the wall opens the second door, retrieves the object, and then closes the second door. The pass-through compartment is then ready for exchange of another object, from either side of the wall to the other side of the wall. Such pass-through compartments can commonly be found in medical laboratory environments and are used to exchange patient specimens or pharmaceuticals, but they also can be found in other business and/or industrial environments.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings.

DETAILED DESCRIPTION

The present disclosure relates to an interlock mechanism for a pass-through compartment (or housing) that engages a first locking pin to lock a first door on the pass-through compartment when a second opposing door on the pass-through compartment is open, and further engages a second locking pin to lock the second door when the first door is open.

Figure 1:
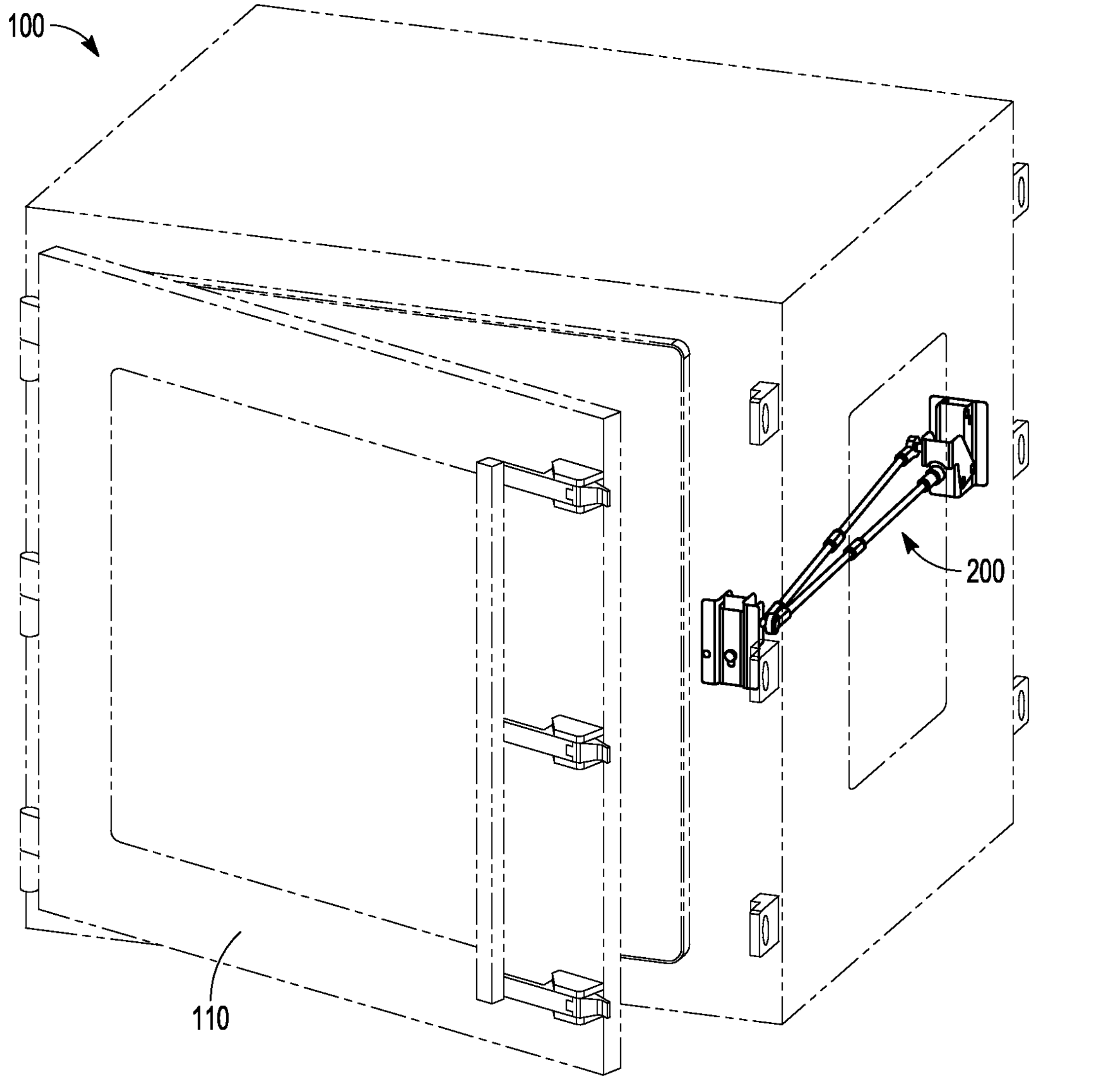
FIG. 1 illustrates a first view of a door locking mechanism installed inside of a wall of a pass-through compartment.
Figure 2:
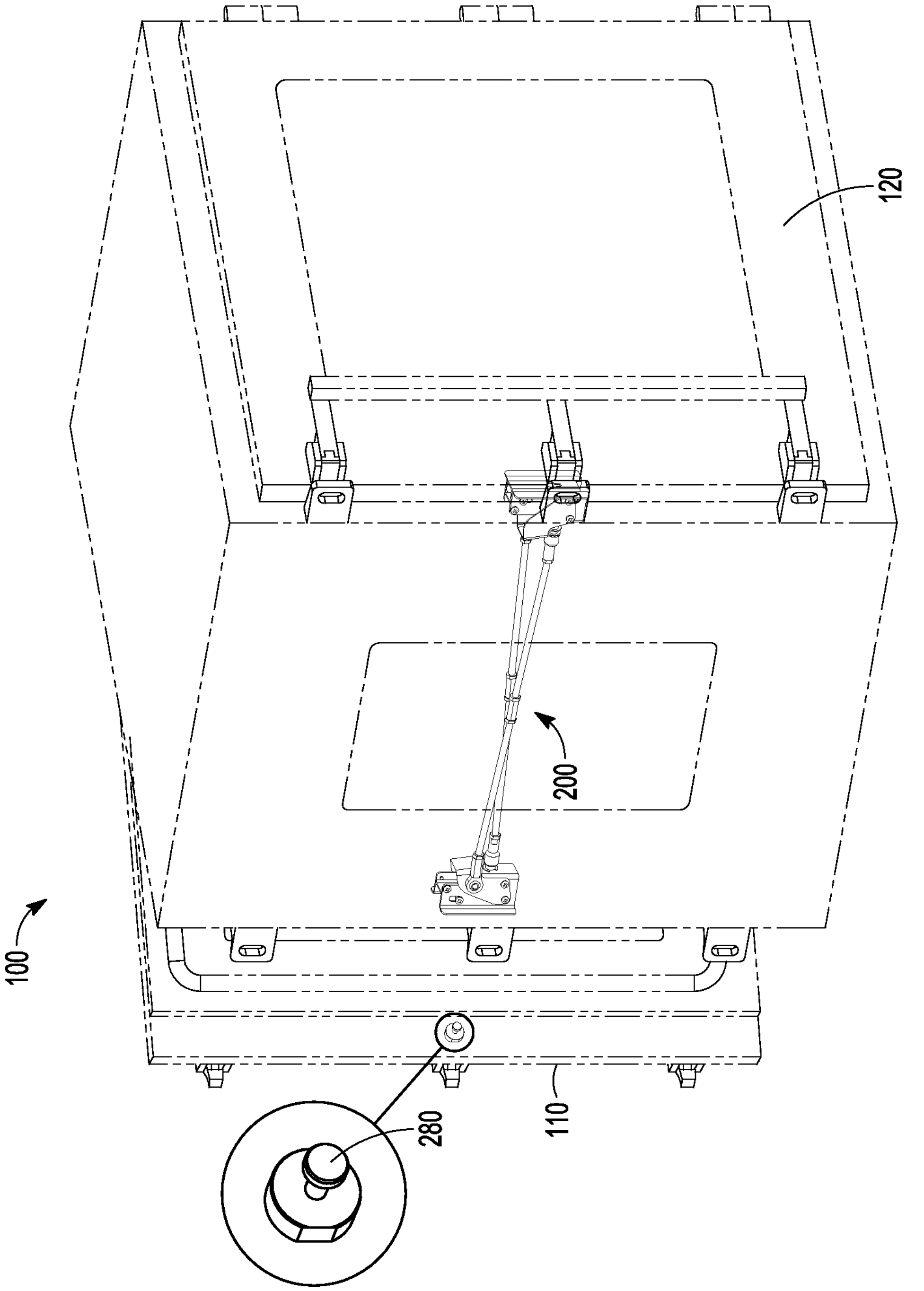
FIG. 2 illustrates a second view of a door locking mechanism installed inside of a wall of a pass-through compartment.

FIGS. 1 and 2 illustrate an example embodiment of a door locking mechanism 200 installed inside of a wall of a pass-through compartment 100. The pass-through compartment 100 includes doors 110 and 120. Each door 110 and 120 has strike pin 280 (or locking pin) protruding from the frame of the door. The interlock mechanism 200 is configured to engage the strike pin 280 on the first door 110 when the second door 120 is opened, thereby locking the first door 110. The interlock mechanism 200 is further configured to engage the strike pin 280 on the second door 120 when the first door 110 is opened, thereby locking the second door 120. The interlocking mechanism 200 consequently prevents the first door 110 from being opened when the second door 120 is open, and also prevents the second door 120 from being opened when the first door 110 is open. Such a feature on a pass-through compartment is desirable in many situations, such as in a medical laboratory environment wherein medical samples are placed into the pass-through compartment through the first door by a patient, and the medical samples are removed from the pass-through compartment by a medical technician via the second door on the pass-through compartment. It is beneficial to have only one door open in this environment because it is not desirable for the patient to have access to the medical laboratory on the other side of the pass-through compartment.

Figure 3:
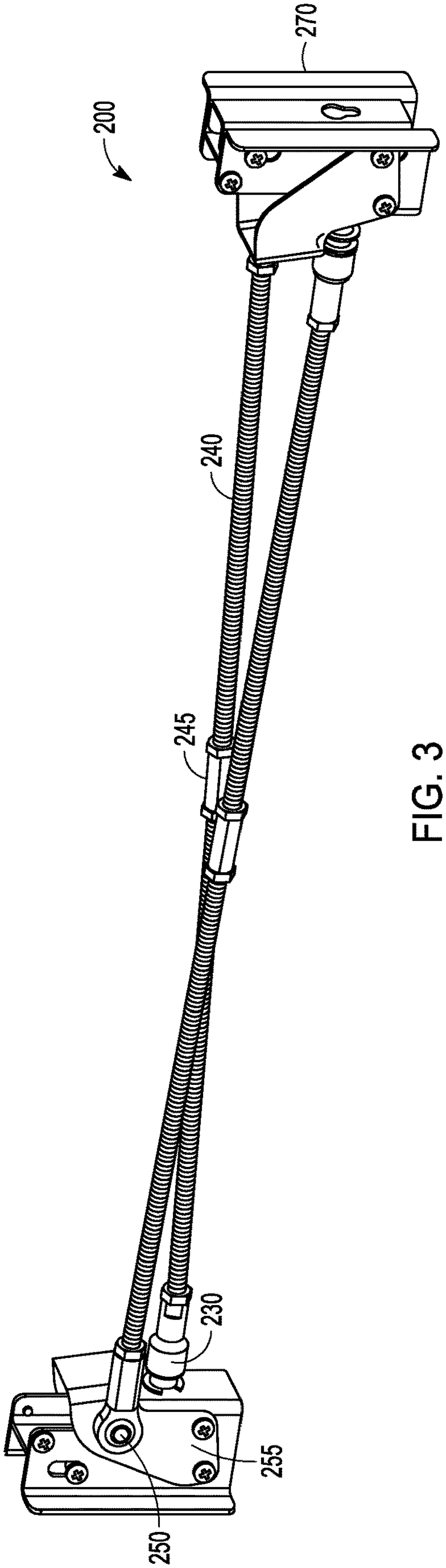
FIG. 3 illustrates a side view of a door locking mechanism for a pass-through compartment.
Figure 4:
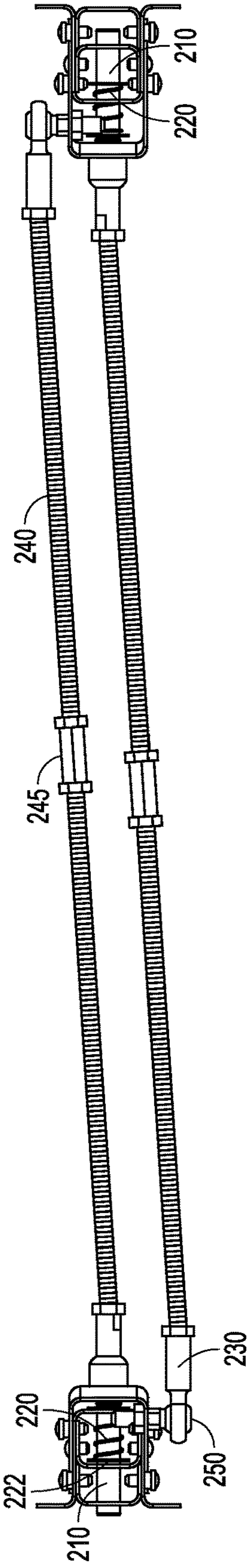
FIG. 4 illustrates a top view of a door locking mechanism for a pass-through compartment.

FIG. 3 illustrates a side view of the door locking mechanism 200 for a pass-through compartment. The door locking mechanism 200 includes an inline ball joint 230, threaded rods 240, connectors 245, ball joints (90 degree) 250, pivot arms 255, and keyhole profiles 270. In an embodiment, the threaded rods 240 are made up of two threaded sections, and are coupled by connector nuts 245. This arrangement permits the rods to be adjusted in length, so that they can be installed in different-sized pass-through compartments. FIG. 4 illustrates a top view of a door locking mechanism 200. As illustrated in FIG. 4, the door locking mechanism 200 also includes spring pins 210, springs 220 that surround the spring pins 210, and a plate 222 which can be integral with the base of the spring pin 210.

Figure 5:
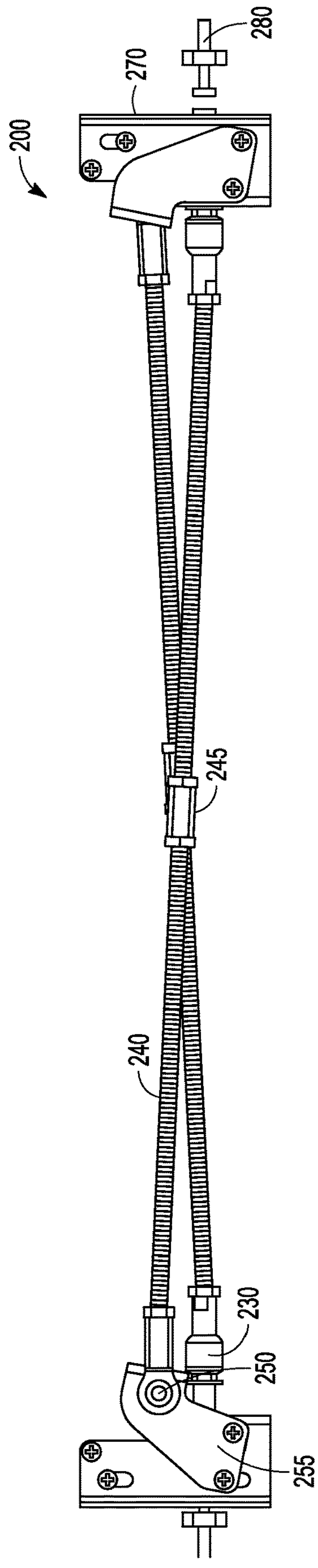
FIG. 5 illustrates another side view of a door locking mechanism for a pass-through compartment.
Figure 6:
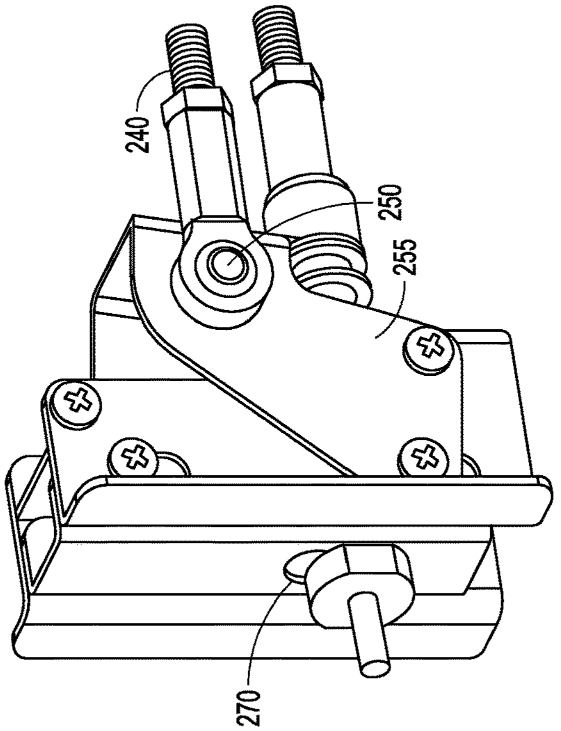
FIG. 6 illustrates a pivot arm and a keyhole profile of a door locking mechanism for a pass-through compartment.

FIG. 5 illustrates another side view of a door locking mechanism 200. FIG. 5 illustrates different views of the inline ball joints 230, the threaded rods 240, the connectors 245, the ball joints 250, the pivot arms 255 and the keyhole profiles 270. FIG. 5 further illustrates the strike pin 280. In the embodiment of FIG. 5, the strike pin 280 on the right side of FIG. 5 is moved away from the assembly (because the door to which it is attached is opened). This causes the spring pin 210 that is in proximity to the strike pin 280 to protrude from the frame of the compartment, and to move its associated rod 240 away from the opposing door. This in turn causes the pivot arm 255 on the left of FIG. 5 to move the keyhole profile 270 and engage the strike pin 280 on the left side of FIG. 5, thereby locking the door to which that strike pin 280 is attached. FIG. 6 illustrates in greater detail the threaded rod 240, the ball joint 250, the pivot arm 255, and the keyhole profile 270.

Figure 7:
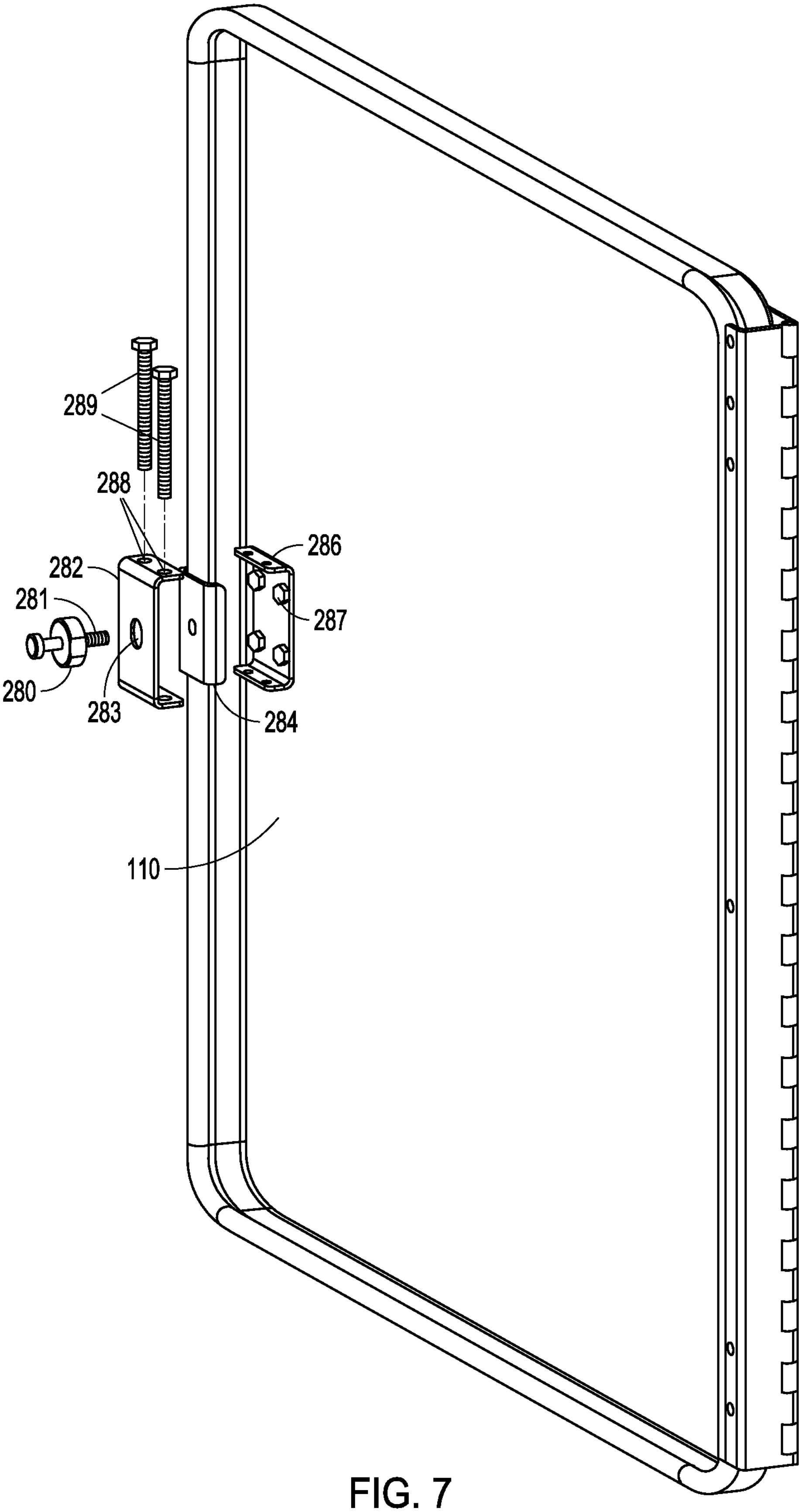
FIG. 7 illustrates an adjustable strike pin assembly.

FIG. 7 illustrates an adjustable strike pin assembly. A bracket 286 is attached to the door 110 via bolts 287 (or screws or other fasteners). An intermediate plate 284 has a threaded nut (not visible in FIG. 7) fixedly attached to it on the side that faces the bracket 286. A bracket 282 includes a hole or passageway 283 that is slightly larger than the strike pin 280. The end of the strike pin has threads 281.

Holes 288 on the top and bottom of bracket 282 receive bolts 289 for attachment to bracket 286. The structure of FIG. 7 provides a means to adjust the position of the strike pin 280 so that it lines up with the spring pin 210, or so that it can be readily adjusted to line up with the spring pin 210.

Specifically, the strike pin 280 is inserted into the hole 283 and into the threaded nut of bracket 284. The strike pin 280 is hand tightened into the bracket 284, such that the strike pin 280 can be moved around because of the larger hole 283. The door is then closed to determine how the strike pin 280 lines up with the spring pin 210. Suitable adjustments are made, and when the alignment is correct, the strike pin is tightened into the bracket 284.

Still referring to FIGS. 1-7, the door locking mechanism 200 functions as follows. When both the first door 110 and the second door 120 are closed, both the first and second spring pins 210 are maintained a position wherein the spring pins 210 are flush with the frame of the pass-through compartment 100. In an embodiment, the first and second spring pins 210 are maintained in this flush position via contact with the strike pin 280 that is attached to the door. That is, the first door 110 and the second door 120 maintain the spring pins 210 in those positions. The maintenance of the spring pins 210 in these positions further maintains the first and second springs 220 in a compressed state.

Upon the first door 110 being opened, the compressed first spring 220 becomes uncompressed. This uncompressing causes the first spring 220 to push against plate 222, which is integral with the base of the spring pin 210, and further causes the first spring pin 210 to protrude out from the frame of the pass-through compartment 100. Since the first spring pin 210 is coupled to the rod 240 via the inline ball joint 230, this causes the rod 240 to be pulled away from the second door 120. The movement of the rod 240 causes the first pivot arm 255 to pivot, thereby moving the first keyhole profile 270 to engage the first strike pin 280 mounted on the second door 120. The engagement of the first strike pin 280 on the second door 120 by the first keyhole profile 270 locks the second door 120 while the first door 110 is open.

When the first door 110 is then closed, the process outlined in the previous process is essentially reversed. That is, when being closed, first door 110 (and in particular the strike pin 280 that is attached to the first door) pushes on and moves the spring pin 210 back into its position flush with the frame of the pass-through compartment 100. This causes the plate 222 to push on and recompress the first spring 210, so that it is positioned once again to become uncompressed when the first door 110 is reopened. Also, the movement of the first spring pin 210 causes the rod 240 to be pushed back towards the second door 120, which causes the first pivot arm 255 to pivot down, and move the first keyhole profile 270 down, thereby unlocking the second door 120. In this state, both the first and second doors are now closed, unlocked, and ready for either one, but not both at the same time, to be opened.

Using the same process, but with different but analogous parts of the locking mechanism 200, the second door 120 can be opened if and only if the first door 110 is closed. And when the second door 120 is opened, the first door 110 becomes locked and stays locked until the second door 120 is reclosed.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplated are examples using any combination or permutation of those elements shown or described (or one or more aspects thereof), either with respect to a particular example (or one or more aspects thereof), or with respect to other examples (or one or more aspects thereof) shown or described herein.

Publications, patents, and patent documents referred to in this document are incorporated by reference herein in their entirety, as though individually incorporated by reference. In the event of inconsistent usages between this document and those documents so incorporated by reference, the usage in the incorporated reference(s) are supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to suggest a numerical order for their objects.

The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. However, the claims may not set forth every feature disclosed herein as embodiments may feature a subset of said features. Further, embodiments may include fewer features than those disclosed in a particular example. Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

EXAMPLES

Example No. 1 is an apparatus including a pass-through housing including a first door and a second opposing door; a first locking pin on the first door and a second locking pin on the second door; and a locking assembly configured to engage the first locking pin and lock the first door when the second door is opened and to engage the second locking pin and lock the second door when the first door is opened.

Example No. 2 includes all the features of Example No. 1, and optionally includes wherein the locking assembly comprises a first vertically moveable pivot arm coupled to a first keyhole profile configured to engage the first locking pin and lock the first door when the second door is opened, and a second vertically movable pivot arm coupled to a second keyhole profile to engage the second locking pin and lock the second door when the first door is opened.

Example No. 3 is an apparatus including a locking assembly configured for operatively coupling to a first door and a second door of a pass-through housing, the locking assembly including a first locking pin on the first door and a second locking pin on the second door; wherein the locking assembly is configured to engage the first locking pin and lock the first door when the second door is opened, and to engage the second locking pin and lock the second door when the first door is opened.

Example No. 4 includes all the features of Example No. 3, and optionally includes wherein the locking assembly includes a first vertically moveable pivot arm having a first keyhole profile configured to engage a first locking pin located on the first door to lock the first door when the second door is opened, and a second vertically movable pivot arm having a second keyhole profile to engage a second locking pin on the second door and lock the second door when the first door is opened.

Example No. 5 is an apparatus including a first assembly configured for coupling to a pass-through compartment, the pass-through compartment comprising a first door and a second door; the first assembly including a first spring pin; a first spring in communication with the first spring pin; a first rod coupled to the first spring pin; a first pivot arm coupled to the first rod; and a first keyhole profile coupled to the first pivot arm; and a second assembly configured for coupling to the pass-through compartment; the second assembly including a second spring pin; a second spring in communication with the second spring pin; a second rod coupled to the second spring pin; a second pivot arm coupled to the second rod; and a second keyhole profile coupled to the second pivot arm.

Example No. 6 includes all the features of Example No. 5, and optionally includes wherein the first spring pin is maintained in a first position when the first door is closed, thereby maintaining the first spring in a compressed state; wherein the first spring is uncompressed when the first door is open, thereby causing the first spring pin to move to a second position protruding from a frame of the pass-through compartment and causing the first rod to be pulled away from the second door, thereby causing the first pivot arm to pivot, thereby moving the first keyhole profile to engage a first strike pin mounted on the second door, thereby locking the second door; wherein the second spring pin is maintained in a third position when the second door is closed, thereby maintaining the second spring in a compressed state; wherein the second spring is uncompressed when the second door is open, thereby causing the second spring pin to move to a fourth position protruding from the frame of the pass-through compartment and causing the second rod to be pulled away from the first door, thereby causing the second pivot arm to pivot, thereby moving the second keyhole profile to engage a second strike pin mounted on the first door, thereby locking the first door.

Example No. 7 includes all the features of Example Nos. 5-6, and optionally includes wherein the pivoting of the first pivot arm causes the first keyhole profile to move in a vertical direction relative to the pass-through compartment and wherein the pivoting of the second pivot arm causes the second keyhole profile to move in the vertical direction relative to the pass-through compartment.

Example No. 8 includes all the features of Example Nos. 5-7, and optionally includes wherein, when the first door is closed, the first spring pin is flush with a frame of the pass-through compartment and the first spring is compressed; wherein, when the first door is open, the first spring is uncompressed, thereby causing the first spring pin to protrude from the frame of the pass-through compartment, thereby causing the first spring pin to pull the first rod away from the second door, thereby causing the first pivot arm to pivot, thereby moving the first keyhole profile to engage a first strike pin mounted on the second door, thereby locking the second door; wherein, when the second door is closed, the second spring pin is flush with the frame of the pass-through compartment and the second spring is compressed; and wherein, when the second door is open, the second spring is uncompressed, thereby causing the second spring pin to protrude from the frame of the pass-through compartment, thereby causing the second spring pin to pull the second rod away from the first door, thereby causing the second pivot arm to pivot, thereby moving the second keyhole profile to engage a second strike pin mounted on the first door, thereby locking the first door.

Example No. 9 includes all the features of Example Nos. 5-8, and optionally includes the pass-through compartment.

Example No. 10 includes all the features of Example Nos. 5-9, and optionally includes wherein the apparatus is positioned inside of a wall of the pass-through compartment.

Example No. 11 includes all the features of Example Nos. 5-10, and optionally includes wherein the first spring pin and the first spring are positioned in proximity to a first latch on the first door; and wherein the first pivot arm and the first keyhole profile are positioned in proximity to a second latch on the second door; and wherein the second spring pin and the second spring are positioned in proximity to the second latch on the second door; and wherein the second pivot arm and the second keyhole profile are positioned in proximity to the first latch on the first door.

Example No. 12 includes all the features of Example Nos. 5-11, and optionally includes wherein the first rod comprises a first section and a second section; and wherein the first section and the second section are threaded; and comprising a first connector nut coupling the first section and the second section, thereby configuring the first rod to be adjustable in length; and wherein the second rod comprises a third section and a fourth section; and wherein the third section and the fourth section are threaded; and comprising a second connector nut coupling the third section and the fourth section, thereby configuring the second rod to be adjustable in length.

Example No. 13 includes all the features of Example Nos. 5-13, and optionally includes wherein the first rod is coupled to the first spring pin via a first ball joint linkage; and wherein the second rod is coupled to the second spring pin via a second ball joint linkage.

Example No. 14 is an apparatus including an assembly configured for coupling to a pass-through compartment, the pass-through compartment having a first door and a second door; the assembly including a spring pin; a spring in communication with the spring pin; a rod coupled to the spring pin; a pivot arm coupled to the rod; and a keyhole profile coupled to the pivot arm.

Example No. 15 includes all the features of Example No. 14, and optionally includes wherein the spring is compressed and the spring pin is flush with a frame of the pass-through compartment when the first door is closed; and wherein the spring is uncompressed when the first door is open, thereby causing the spring pin to protrude through the frame of the pass-through compartment and causing the rod to be pulled away from the second door, thereby causing the pivot arm to pivot, thereby moving the keyhole profile to engage a strike pin mounted on the second door, thereby locking the second door.

Example No. 16 includes all the features of Example Nos. 14-15, and optionally includes wherein the pivoting of the pivot arm causes the keyhole profile to move in a vertical direction relative to the pass-through compartment.

Example No. 17 includes all the features of Example Nos. 14-16, and optionally includes the pass-through compartment.

Example No. 18 includes all the features of Example Nos. 14-17, and optionally includes wherein the apparatus is positioned inside of a wall of the pass-through compartment.

Example No. 19 includes all the features of Example Nos. 14-18, and optionally includes wherein the spring pin and the spring are positioned in proximity to a latch on the first door; and wherein the pivot arm and the keyhole profile are positioned in proximity to a second latch on the second door.

Example No. 20 includes all the features of Example Nos. 14-19, and optionally includes wherein the rod comprises a first section and a second section; and wherein the first section and the second section are threaded; and comprising a connector nut coupling the first section and the second section, thereby configuring the rod to be adjustable in length.

Example No. 21 includes all the features of Example Nos. 14-20, and optionally includes wherein the rod is coupled to the spring pin via a ball joint linkage.

Example No. 22 includes all the features of Example Nos. 14-21, and optionally includes wherein the strike pin is adjustable for alignment with the spring pin.

Example No. 23 includes all the features of Example Nos. 14-22, and optionally includes a first bracket configured for attachment to the first door; a second bracket configured for attachment to the first bracket, the second bracket comprising a hole configured for receiving the strike pin; and an intermediate bracket configured for placement between the first bracket and the second bracket, the intermediate bracket comprising a hole with a threaded nut; wherein the strike pin comprises a threaded end; and wherein the threaded nut of the intermediate bracket is configured for receiving the threaded end of the strike pin.

The invention claimed is:

1. An apparatus comprising:

a first assembly configured for coupling to a pass-through compartment, the pass-through compartment comprising a first door and a second door;

the first assembly comprising:

a first spring pin;

a first spring in communication with the first spring pin;

a first rod coupled to the first spring pin;

a first pivot arm coupled to the first rod; and a first keyhole profile coupled to the first pivot arm; and a second assembly configured for coupling to the pass-through compartment;

the second assembly comprising:

a second spring pin;

a second spring in communication with the second spring pin;

a second rod coupled to the second spring pin;

a second pivot arm coupled to the second rod; and a second keyhole profile coupled to the second pivot arm;

wherein the first spring pin is maintained in a first position when the first door is closed, thereby maintaining the first spring in a compressed state;

wherein the first spring is uncompressed when the first door is open, thereby causing the first spring pin to move to a second position protruding from a frame of the pass-through compartment and causing the first rod to be pulled away from the second door, thereby causing the first pivot arm to pivot, thereby moving the first keyhole profile to engage a first strike pin mounted on the second door, thereby locking the second door;

wherein the second spring pin is maintained in a third position when the second door is closed, thereby maintaining the second spring in a compressed state; and wherein the second spring is uncompressed when the second door is open, thereby causing the second spring pin to move to a fourth position protruding from the frame of the pass-through compartment and causing the second rod to be pulled away from the first door, thereby causing the second pivot arm to pivot, thereby moving the second keyhole profile to engage a second strike pin mounted on the first door, thereby locking the first door.

2. The apparatus of claim 1, wherein the pivoting of the first pivot arm causes the first keyhole profile to move in a vertical direction relative to the pass-through compartment and wherein the pivoting of the second pivot arm causes the second keyhole profile to move in the vertical direction relative to the pass-through compartment.

3. The apparatus of claim 1, wherein, when the first door is closed, the first spring pin is flush with a frame of the pass-through compartment and the first spring is compressed;

wherein, when the first door is open, the first spring is uncompressed, thereby causing the first spring pin to protrude from the frame of the pass-through compartment, thereby causing the first spring pin to pull the first rod away from the second door, thereby causing the first pivot arm to pivot, thereby moving the first keyhole profile to engage a first strike pin mounted on the second door, thereby locking the second door;

wherein, when the second door is closed, the second spring pin is flush with the frame of the pass-through compartment and the second spring is compressed; and wherein, when the second door is open, the second spring is uncompressed, thereby causing the second spring pin to protrude from the frame of the pass-through compartment, thereby causing the second spring pin to pull the second rod away from the first door, thereby causing the second pivot arm to pivot, thereby moving the second keyhole profile to engage a second strike pin mounted on the first door, thereby locking the first door.

4. The apparatus of claim 1, wherein the apparatus is positioned inside of a wall of the pass-through compartment.

5. The apparatus of claim 1, wherein the first spring pin and the first spring are positioned in proximity to a first latch on the first door; and wherein the first pivot arm and the first keyhole profile are positioned in proximity to a second latch on the second door; and wherein the second spring pin and the second spring are positioned in proximity to the second latch on the second door, and wherein the second pivot arm and the second keyhole profile are positioned in proximity to the first latch on the first door.

6. The apparatus of claim 1, wherein the first rod comprises a first section and a second section; and wherein the first section and the second section are threaded; and comprising a first connector nut coupling the first section and the second section, thereby configuring the first rod to be adjustable in length; and wherein the second rod comprises a third section and a fourth section; and wherein the third section and the fourth section are threaded; and comprising a second connector nut coupling the third section and the fourth section, thereby configuring the second rod to be adjustable in length.

7. The apparatus of claim 1, wherein the first rod is coupled to the first spring pin via a first ball joint linkage; and wherein the second rod is coupled to the second spring pin via a second ball joint linkage.

8. An apparatus comprising:

an assembly configured for coupling to a pass-through compartment, the pass-through compartment having a first door and a second door;

the assembly comprising:

a spring pin;

a spring in communication with the spring pin;

a rod coupled to the spring pin;

a pivot arm coupled to the rod;

a keyhole profile coupled to the pivot arm;

a first bracket configured for attachment to the second door;

a second bracket configured for attachment to the first bracket, the second bracket comprising a hole configured for receiving a strike pin; and an intermediate bracket configured for placement between the first bracket and the second bracket, the intermediate bracket comprising a hole with a threaded portion;

wherein the spring is compressed and the spring pin is flush with a frame of the pass-through compartment when the first door is closed;

wherein the spring is uncompressed when the first door is open, thereby causing the spring pin to protrude through the frame of the pass-through compartment and causing the rod to be pulled away from the second door, thereby causing the pivot arm to pivot, thereby moving the keyhole profile to engage a strike pin mounted on the second door, thereby locking the second door;

wherein the strike pin is adjustable for alignment with the spring pin wherein the strike pin comprises a threaded end; and wherein the threaded portion of the intermediate bracket is configured for receiving the threaded end of the strike pin.

9. The apparatus of claim 8 wherein the pivoting of the pivot arm causes the keyhole profile to move in a vertical direction relative to the pass-through compartment.

10. The apparatus of claim 8, wherein the apparatus is positioned inside of a wall of the pass-through compartment.

11. The apparatus of claim 8, wherein the spring pin and the spring are positioned in proximity to a latch on the first door; and wherein the pivot arm and the keyhole profile are positioned in proximity to a second latch on the second door.

12. The apparatus of claim 8, wherein the rod comprises a first section and a second section; and wherein the first section and the second section are threaded; and comprising a connector nut coupling the first section and the second section, thereby configuring the rod to be adjustable in length.

13. The apparatus of claim 8, wherein the rod is coupled to the spring pin via a ball joint linkage.

* * * * *